(12) United States Patent
David et al.

(10) Patent No.: US 11,947,652 B2
(45) Date of Patent: *Apr. 2, 2024

(54) MANIPULATING USER CREDENTIALS

(71) Applicant: VIM INC., San Francisco, CA (US)

(72) Inventors: Asaf David, Tel Aviv (IL); Nicolas Mendzylewski, Tel Aviv (IL); Moran Shemesh, Tel Aviv (IL); Chen Rozenes, Tel Aviv (IL); Nandy Vaisman, Ramat Gan (IL)

(73) Assignee: Vim Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,989

(22) Filed: Jul. 26, 2022

(65) Prior Publication Data

US 2023/0143190 A1 May 11, 2023

Related U.S. Application Data

(60) Provisional application No. 63/276,925, filed on Nov. 8, 2021.

(51) Int. Cl.
*G06F 21/33* (2013.01)
(52) U.S. Cl.
CPC .................................. *G06F 21/33* (2013.01)
(58) Field of Classification Search
CPC .......... G06F 21/33; G06F 21/31; G06F 21/41; G06F 21/45

USPC .......................................................... 726/18
See application file for complete search history.

(56) References Cited

U.S. PATENT DOCUMENTS

| | | | |
|---|---|---|---|
| 2003/0131266 A1* | 7/2003 | Best | H04L 63/20 713/184 |
| 2009/0307058 A1* | 12/2009 | Murphy | G06Q 30/02 705/7.29 |
| 2017/0126659 A1* | 5/2017 | Nichols | H04L 63/06 |
| 2018/0054429 A1* | 2/2018 | Donahue | G06F 21/577 |
| 2018/0191688 A1* | 7/2018 | Chen | H04L 9/3226 |
| 2022/0070000 A1* | 3/2022 | Gondza | H04L 63/123 |

FOREIGN PATENT DOCUMENTS

WO WO-2014069998 A1 * 5/2014 ......... G06F 21/6245

\* cited by examiner

*Primary Examiner* — Jacob Lipman
(74) *Attorney, Agent, or Firm* — Myers Wolin, LLC

(57) ABSTRACT

A method, apparatus and product comprising: identifying a login session in a Graphical User Interface (GUI) of a user device, wherein the login session is configured to enable a user of the user device to login to a first software system; extracting one or more user credentials from the login session, wherein the one or more user credentials comprise one or more user inputs to the login session; manipulating the one or more user credentials using one or more manipulations, thereby obtaining manipulated credentials; and automatically utilizing the manipulated credentials in order to login the user into a second software system.

20 Claims, 3 Drawing Sheets

MANIPULATING USER CREDENTIALS

CROSS-REFERENCE TO RELATED APPLICATION

This application claims the benefit of Provisional Patent Application No. 63/276,925, titled "Trustless Single Sign On" filed Nov. 8, 2021, which is hereby incorporated by reference in its entirety without giving rise to disavowment.

TECHNICAL FIELD

The present disclosure relates to user credentials in general, and to manipulations of credentials for signing on to systems automatically, in particular.

BACKGROUND

A Single Sign-On (SSO) may comprise an authentication scheme that allows a user to use a single set of credentials in order to log in to any of several related, yet independent, software systems. In some exemplary embodiments, the SSO authentication scheme allows a user to log in once and to access services of the related software systems without re-entering her credentials. The single authentication may provide access to multiple related applications by passing an authentication token to the related applications.

BRIEF SUMMARY

One exemplary embodiment of the disclosed subject matter is a method comprising: identifying a login session in a Graphical User Interface (GUI) of a user device, wherein the login session is configured to enable a user of the user device to login to a first software system; extracting one or more user credentials from the login session, wherein the one or more user credentials comprise one or more user inputs to the login session; manipulating the one or more user credentials using one or more manipulations, thereby obtaining manipulated credentials; and automatically utilizing the manipulated credentials in order to login the user into a second software system.

Optionally, the manipulated credentials are not identified by a backend of the second software system, and the method further comprises: obtaining, from the user, dedicated credentials of the second software system, wherein the dedicated credentials are different from the manipulated credentials; identifying, based on the dedicated credentials, an account of the user in the second software system; and linking the account of the user to the manipulated credentials, thereby enabling the backend of the second software system to login the user into the second software system using the manipulated credentials.

Optionally, said manipulating comprises applying a one-way function on the one or more user credentials, whereby limiting an ability of deriving the one or more user credentials from the manipulated credentials.

Optionally, said manipulating comprises obtaining a user-specific salt, adding the user-specific salt to the one or more user credentials, thereby obtaining salted user credentials, and applying a one-way function to the salted user credentials, to thereby limit an ability of deriving the one or more user credentials from the manipulated credentials.

Optionally, the method comprises identifying a password changing session in the GUI of the user device, wherein the password changing session is configured to replace the one or more user credentials with one or more second user credentials, thereby changing user credentials of the user in the first software system; extracting the one or more second user credentials from the GUI; manipulating the one or more second user credentials using the one or more manipulations, thereby obtaining second manipulated credentials; and automatically linking the second manipulated credentials to an account of the user in the second software system, whereby enabling to login the user into the second software system using the second manipulated credentials instead of the manipulated credentials.

Optionally, the method comprises identifying that at least one manipulation record is absent from a local storage of the user device, wherein the at least one manipulation record is configured to manipulate the one or more user credentials; generating the at least one manipulation record, thereby generating the one or more manipulations; and performing said manipulating using the at least one manipulation record.

Optionally, said manipulating is performed after identifying that the login session enabled the user to login to the first software system successfully.

Optionally, the second software system is configured to extend a functionality of the first software system.

Optionally, the GUI of the first software system is executed using a browser, wherein the second software system is associated with a browser extension that is executed by the browser, whereby the second software system provides an augmented functionality providing an additional functionality to the GUI of the first software system via an overlay over a page displayed by the browser.

Optionally, said identifying the login session is based on at least one of: computer vision techniques, object detection techniques, monitoring network traffic, monitoring network Application Programming Interface (API) calls, invoking network API calls, and invoking Operating System (OS) specific native API calls.

Another exemplary embodiment of the disclosed subject matter is an apparatus comprising a processor and coupled memory, said processor being adapted to: identify a login session in a GUI of a user device, wherein the login session is configured to enable a user of the user device to login to a first software system; extract one or more user credentials from the login session, wherein the one or more user credentials comprise one or more user inputs to the login session; manipulate the one or more user credentials using one or more manipulations, thereby obtaining manipulated credentials; and automatically utilize the manipulated credentials in order to login the user into a second software system.

Yet another exemplary embodiment of the disclosed subject matter is a computer program product comprising a non-transitory computer readable medium retaining program instructions, which program instructions when read by a processor, cause the processor to: identify a login session in a GUI of a user device, wherein the login session is configured to enable a user of the user device to login to a first software system; extract one or more user credentials from the login session, wherein the one or more user credentials comprise one or more user inputs to the login session; manipulate the one or more user credentials using one or more manipulations, thereby obtaining manipulated credentials; and automatically utilize the manipulated credentials in order to login the user into a second software system.

Yet another exemplary embodiment of the disclosed subject matter is a system comprising a processor and coupled memory, said processor being adapted to: identify a login session in a GUI of a user device, wherein the login session is configured to enable a user of the user device to login to a first software system; extract one or more user credentials from the login session, wherein the one or more user credentials comprise one or more user inputs to the login session; manipulate the one or more user credentials using one or more manipulations, thereby obtaining manipulated credentials; and automatically utilize the manipulated credentials in order to login the user into a second software system.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
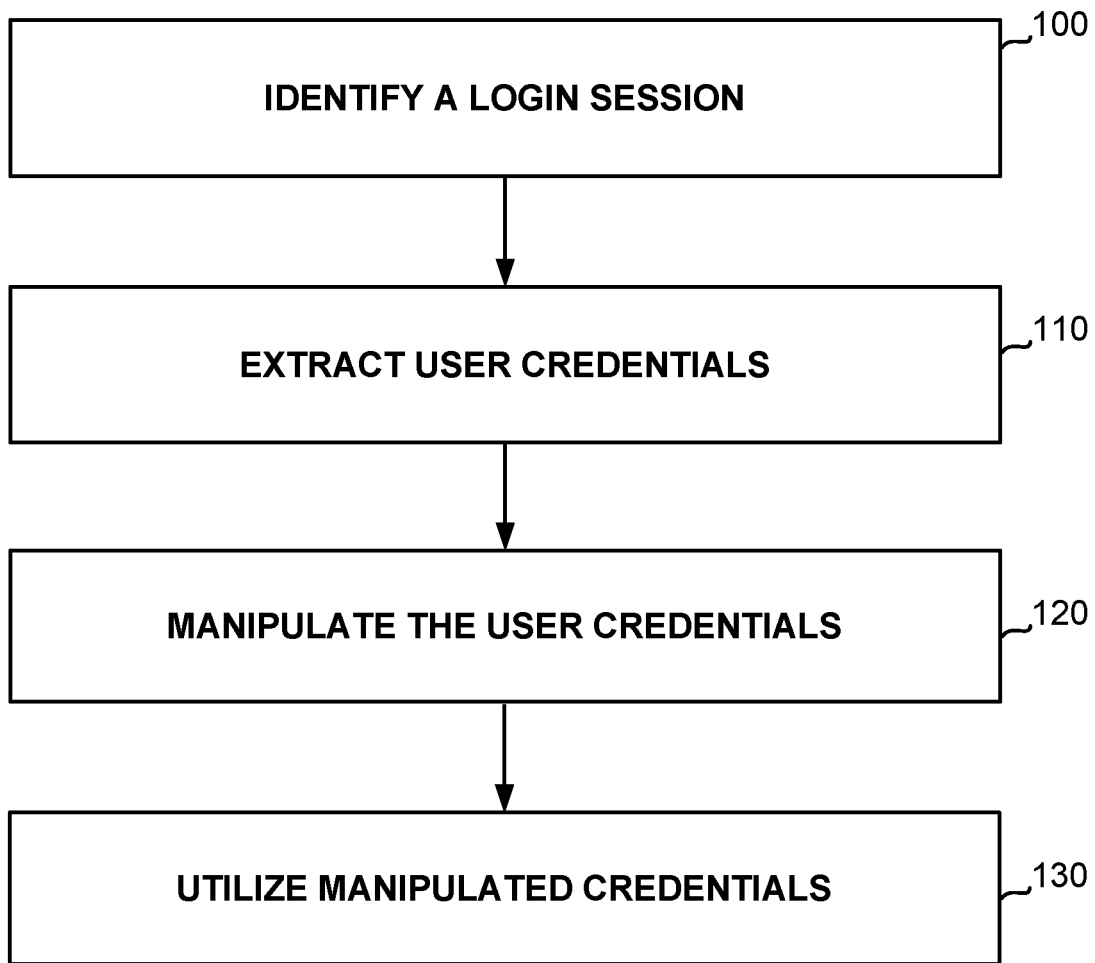
FIG. 1 illustrates an exemplary flowchart diagram of a method, in accordance with some exemplary embodiments of the disclosed subject matter.

One technical problem dealt with by the disclosed subject matter is enabling a user to use a single set of credentials in order to logon to two or more software systems such as applications, webpages, services, or the like, without re-entering her credentials or using two sets of different credentials. For example, the two or more software systems may comprise associated systems, independent systems, systems that can augment functionality to one another, or the like.

Another technical problem dealt with by the disclosed subject matter is enabling a user to, upon signing in to one or more first services, automatically sign in to at least one second service. For example, the second service may be associated to a first service, may be configured to provide additional data or functionality thereto, or the like. In some cases, the second service may belong to one or more suppliers, vendors, entities, distributers, or the like (referred to as 'suppliers'), that are different than the suppliers of the first services. In some exemplary embodiments, it may be desired to enable a user to automatically log on to the second service upon utilizing the first services, without being required to manually log in to the second service using different or overlapping user credentials.

A naïve solution may comprise utilizing a Single Sign-On (SSO) connection to automatically sign in to a second service upon loading a page of a first service. An SSO authentication scheme may allow a user to login to any of several related software systems using a single identifier (ID) and password, by logging in once and accessing services of the related software systems without re-entering her credentials. The single authentication may provide access to multiple related applications by passing the authentication token to the related applications. In some exemplary embodiments, the naïve solution of utilizing an SSO authentication scheme may have one or more drawbacks. In some exemplary embodiments, a first system may be implemented in a manner that utilizes non-SSO authentication scheme, that does not support an SSO authentication scheme, that does not enable to integrate an SSO authentication scheme, or the like. In some cases, privacy regulations or constraints may prevent the first service from passing the authentication token to the second service. For example, the SSO authentication scheme may not be feasible for systems that comply with one or more privacy constraints. In some cases, the SSO authentication scheme may not be feasible for systems that do not enable or support cooperation or communications between the systems' backends, such as sensitive data systems. In some cases, a small entity may not have sufficient resources for implementing SSO integration. It may be desired to overcome such drawbacks.

Yet another technical problem dealt with by the disclosed subject matter is enabling a user to use a single set of credentials in order to login to two or more software systems, without utilizing the SSO authentication mechanism, and without relying on trust between the systems. In some exemplary embodiments, in case that the SSO authentication mechanism cannot be used, it may be desired to provide a trustless independent mechanism that enables a user to login to two or more software systems using a single set of credentials, without integrating the backends of systems, without relying on trust or communications between the systems, or the like.

Yet another technical problem dealt with by the disclosed subject matter is enabling a second service such as an extending service, to extend a functionality or content of a rendered page of one or more first services, without requiring the user that is rendering the page to login separately to the extending service. In some exemplary embodiments, the rendered page may, in some cases, be associated with a data system such as an Electronic Health Record (EHR) system that may retain data records of one or more users, patients, or the like. In some exemplary embodiments, a plurality of separate data systems may retain other records of different or overlapping users, e.g., with different or overlapping user information.

In some exemplary embodiments, EHRs, also referred to as Electronic Medical Records (EMRs), may comprise records of medical data of patients in a digital version, provider data, payer data, or the like. In some exemplary embodiments, an EHR may contain the medical and treatment histories of patients, and may be accessed via EHR software systems such as desktop applications, websites, or the like. In some exemplary embodiments, EHR systems may store data that is not synchronized with each other, such as regarding a same subject. For example, a record of a first disease of a patient may be stored at a first EHR system, and a record of a second disease of the same patient may be stored at a second EHR system.

In some exemplary embodiments, EHR systems may be used by various actors or entities such as a payer entity, a covered entity, a provider entity, or the like. In some exemplary embodiments, a payer entity may comprise a health insurance entity, an entity that assumes the risk of paying for medical treatments, or the like. In some exemplary embodiments, a provider may comprise doctors, Primary Care Physicians (PCPs), clinics, or the like, e.g., which may be supported by one or more payers. In some exemplary embodiments, a covered entity may comprise an entity who provides treatment, payment and/or operations in healthcare such as a doctor's office, dental offices, clinics, psychologists, nursing homes, pharmacies, hospitals or home healthcare agencies, health plans, insurance companies, Health Maintenance Organizations (HMOs), or the like. In some exemplary embodiments, separate independent EHR systems that retain different data records may be used by different providers, different payers, different covered entities, or the like.

In some exemplary embodiments, EHR systems associated with any entity type may retain a database or repository that comprises sensitive medical data, such as Protected health information (PHI). In some exemplary embodiments, PHI may comprise data about a health status, provision of health care, payment for health care, or the like, that is created or collected by a covered entity, and can be linked to a specific individual, patient, or the like. In some exemplary embodiments, government regulations, privacy constraints, or the like, may impose one or more restrictions on handling PHI information. In some exemplary embodiments, when handling PHI information, EHR systems may be required to comply with regulations, constraints, or protocols, such as the Fast Healthcare Interoperability Resources (FHIR) standard created by the Health Level Seven International (HL7) health-care standards organization, which comprises a permitted Application Programming Interface (API) for exchanging EHR records. In some exemplary embodiments, government regulations, as well as privacy constraints of clients, may prohibit unrelated parties from accessing PHI of a patient, such as a patient's medical record or payment history. In some exemplary embodiments, the privacy constraints may prevent an EHR system that is used on behalf of a patient from accessing data of the same patient that is retained in a separate EHR system, even if such information is crucial for providing medical care to the patient.

In some exemplary embodiments, EHR systems that do not share with each other data about a shared patient may have one or more drawbacks. For example, in case an EHR system of a patient's payer and an EHR system of the patient's provider are prevented from sharing the patient's data, or do not share such data for any other reason, the provider may not know about the rights, requirements, conditions, or the like, of the patient, which may be dictated by the payer. As another example, in case separate EHR systems that retain data records of the patient are prevented from sharing the patient's data with each other, the user accessing the EHR system on behalf of the patient may use a first EHR system without having access to medical recommendations from the second EHR system, which may result with the user being provided with an incorrect diagnosis at the first EHR system as the relevant medical information may be retained at the second EHR system. It is further noted that the phrase 'user' may refer to any person or automated program that utilizes a EHR system on behalf of one or more patients. For example, the user may be a provider, doctor, caretaker, employee of a covered entity, secretary, or the like, that utilizes an EHR system on behalf of a patient. In other cases, the user may be the patient herself.

In some exemplary embodiments, in order to correlate user information over different EHR systems, without violating privacy constraints, an extending service may be provided for retaining a separate storage of patient records, which may be accumulated from multiple separate EHR systems over which the extending service may be executed. In some exemplary embodiments, the extending service may comprise an extending server that may be configured to retain the storage of patient records, as well as data relating to payer and provider entities, accumulate data from EHR systems, and provide data or functionalities to active EHR systems. The extending service may enable an EHR session of a patient to access medical records of the patient that are retained in different EHR systems such as of a payer entity, a provider entity, a covered entity, a combination thereof, or the like, via the storage of the extending server.

In some exemplary embodiments, a frontend of the extending service may comprise one or more software agents that may be retained locally at user devices, at provider computers, at payer devices, or the like. In some exemplary embodiments, the agents may be configured to augment EHR systems with an augmented software layer (also referred to as "extending layer") that may indicate to a first active EHR system medical information or functionalities that are derived from a second EHR system to which the first EHR system has no access. In some exemplary embodiments, utilizing patient records and related data from separated EHR systems may enable the patient or a caretaker of the patient to locate treatments gaps of the patient, to diagnose the patient in a more informed or accurate manner, to inform the patient with provider options that are made available to her by her payer, to inform the patient of additional information regarding the provider options, or the like.

In some exemplary embodiments, an agent may comprise a software module such as a browser extension that is executed by a browser of a user device, a Software Development Kit (SDK) that embeds one or more functionalities in a page that is rendered by the browser, or the like. Alternatively, an agent may comprise a software module that may be configured to be executed over a desktop application. For example, a software module that is associated with the desktop application may be retained in the disk memory. In some exemplary embodiments, the agent (also referred to as the "extension") may be configured to monitor a display, accumulate information therefrom, and provide an extending layer over the display based on the accumulated information. In some exemplary embodiments, the extension may be configured to obtain a Document Object Model (DOM) or any other representation of the browsed EHR pages so that an associated augmented functionality and application can be executed thereover. It is noted that the term 'browsed page', as used herein, may refer to a page that is rendered by a browser, or to a page that is presented by a desktop application. In some cases, determining a representation of the page may be performed manually. In some cases, determining a page representation may be performed automatically, such as by using computer vision techniques, automatic classifiers, text recognition methods, image recognition methods, monitoring network traffic, monitoring or invoking network API calls, invoking Windows™ native API calls, invoking Operating System (OS) specific native API calls, or the like.

In some exemplary embodiments, in response to obtaining a representation of a browsed page of any EHR system, and identifying one or more events thereof, one or more missing options, or the like, the extension may be configured to generate or provide an extending layer as an overlay over the browsed page, as an injected code that is embedded in the page, or the like. In some exemplary embodiments, the extending layer may enable to augment data, content, resources, applications, functions, or the like, over a display of an end device, e.g., upon browsing a page of an EHR system. In some exemplary embodiments, the extending layer may indicate or be generated based on data and functionalities derived from EHR systems that are not being used by the browsed page, e.g., an EHR data system of insurance companies, of other providers, or the like. In some exemplary embodiments, the augmented functionalities or applications may comprise, for example, recommendations of providers that are supported by the payer, scores or rates of doctors based on selected parameters such as cost and quality, scores or rates that are obtained from the payer's system, medication history, care gaps, diagnosis gaps, or the like. In some cases, the extending layer may be configured to generate an Inline Frame (Iframe) that may embed a document, e.g., a HyperText Markup Language (HTML) document, of a different EHR system within the browsed page.

In some exemplary embodiments, in order to enable the EHR system to utilize the extending service for providing the extending layer in a secure and privacy-retaining manner, it may be necessary to link the current user with patient records in of the extending service to which the user has authorized access, and ensure that the user is not provided with unauthorized data. For example, the user may not be authorized to access data records of patients that are not represented by the user. In some exemplary embodiments, in order to ensure that the user is authorized for accessing data from both systems, the user may be required to provide EHR credentials for the EHR system, and to provide different credentials for the extending service.

It may be desired to enable the user to utilize a single set of credentials in order to login to both systems, without compromising on a security of the user, the patients, or the like. In some exemplary embodiments, the EHR system may be implemented in a manner that utilizes non-SSO authentication scheme, that does not support an SSO authentication scheme, or the like, thus not enabling the user to utilize the EHR credentials in order to login to both the EHR system and the extending service. In some cases, EHR systems and clinic setups may not support SSO connections, such as due to the EHR systems comprising sensitive and protected data, due to privacy constraints, due to technical limitations, or the like. In some cases, an EHR system of a small entity may not have sufficient resources for implementing SSO integration. For example, an EHR system of a small clinic may support an SSO authentication scheme, but may not have an Information Technology (IT) department that can implement the SSO authentication scheme. In some cases, the extending service may comprise an independent system that has not access to the code of the EHR system and may not be able to modify the EHR system so that the EHR system will support an SSO authentication scheme.

Yet another technical problem dealt with by the disclosed subject matter is to provide users with a smooth and seamless integration of the extending layer with the EHR system that is being used, without requiring to perform a login session twice, while enabling the extending layer to push valuable content on to a user's workflow. For example, it may be desired that the extending layer will be enabled to monitor the browsed page and provide recommendations of doctors that are being searched for, without adversely affecting the user's workflow in the EHR system such as by being required to handle sign ins to the extending service every time an EHR system is activated, launched, or the like.

Yet another technical problem dealt with by the disclosed subject matter is activating the extending layer upon any usage or modification of a patient record in any EHR system that is being used, e.g., in real time. In some exemplary embodiments, it may be desired to automatically load and activate the extending layer so that it is enabled to provide its augmented functionality, to accumulate up-to-date information regarding the patient, or the like. For example, it may be desired to enable a user to automatically log on to the extending service, such as upon launching an EHR page over which the extending layer is configured to be executed, thus enabling the extending layer to monitor user interactions, monitor the display, provide augmented functionalities to the display, or the like.

Yet another technical problem dealt with by the disclosed subject matter is executing the extending layer and enabling it to push content to a browsed EHR page, load resources thereto, or the like, only in case the content that is added to the browsed EHR page is allowed to be exposed to the user consuming the browsed EHR page. In order to verify that the content or resources are allowed to be exposed to the user, it may be necessary to authenticate the user and verify her identity every time the extending layer is launched over an EHR system.

It is noted that the disclosed subject matter may be exemplified with relation to an extending service that is executed over different base EHR systems, but it is not limited to the medical realm or to EHR systems. As an example, the disclosed subject matter may be applied on any other extending service that is provided over any other independent or dependent base systems, or to any other types of services, systems, or applications. In some exemplary embodiments, the EHR systems that are described herein may comprise any software systems that utilize user credentials, that retain sensitive data, that do not support an SSO authentication scheme, or the like.

One technical solution provided by the disclosed subject matter is using a single set of credentials in order to logon to two or more software systems (referred to as 'a trustless SSO'). In some cases, the trustless SSO procedure may be performed by a software agent such as a browser extension, a desktop SDK, or any other agent that is executed at a user device and is enabled to monitor a display of a user device, monitor user interactions with the display, or the like. For example, the agent, also referred to as 'browser extension', may be independent from, or embedded within, the agent that is configured to execute the extending layer over EHR systems.

In some exemplary embodiments, the browser extension may be configured to monitor the user's display, and upon identifying that the display depicts an attempt of the user to sign in to a first software system, e.g., an EHR system, the browser extension may be configured to initiate a trustless SSO session with a second software system such as the extending service. In some exemplary embodiments, the browser extension may be configured to scrape the credentials that were used to sign in to the EHR system and utilize them for logging on to the extending service, e.g., by manipulating them. In some exemplary embodiments, the browser extension may be configured to identify the login process of the hosted EHR interface, capture locally the user credentials, manipulate the credentials, and utilize the manipulated credentials in order to eventually log in to an account of the user in a backend of the extending service. In some cases, upon logging in to the account of the user at the extending service, an extending layer may be loaded over the EHR system, and display information and functionality according to permissions of the account. For example, based on the user's account, the extending layer may be enabled to display to the user only data that the user is authorized to access.

In some exemplary embodiments, the browser extension may utilize the credentials of the user that are inserted to the EHR interface in a trustless manner, without requiring the backend of the EHR system that is utilized by the user to communicate or be integrated with the extending service, without depending on a cooperation of the EHR system with the extending service, or the like. In some exemplary embodiments, in order to activate and load an extending layer upon the loaded EHR interface, the extension may be configured to perform a trustless single sign-on procedure in order to automatically login to a user account of the user at the extending service, enabling to link all of the patients' data that is retained by the backend of the extending service and that is handled by the user, to the user that logged into the EHR system. In some exemplary embodiments, the browser extension may perform the trustless single sign-on procedure and automatically sign in to the extending service via a browser that is executing the browser extension. In some exemplary embodiments, in case of a desktop agent, the desktop agent may be executed over a desktop EHR application, and implement the trustless single sign-on procedure over the desktop application, e.g., by scraping the credentials and signing in the user to her user account in the extending service. In some exemplary embodiments, the trustless single sign-on procedure may enable to create a "soft" indirect connection between an account of the user at the EHR system and an account of the user at the extending system. In some cases, linking the user's account in the extending service to the credentials of the EHR system may enable to load additional data over the EHR system's Graphical User Interface (GUI).

It is further noted that any reference to the browser extension may interchangeably refer to the desktop agent. For illustrative reasons, and for ease of understanding, the disclosed subject matter may, in some cases, refer only to the browser extension.

In some exemplary embodiments, during the login process to the EHR system, the login activity may be monitored by the extension. In some exemplary embodiments, upon identifying that a user's account in base system such as an EHR system is being signed in to, the extension may automatically obtain, scrape, or extract the credentials of the user that are provided to the EHR system. In some exemplary embodiments, credentials may be captured locally, e.g., by the browser extension being executed on the user device. In some exemplary embodiments, credentials may be captured during a login session, or an alternative session in which credentials are provided, such as a password changing session.

In some exemplary embodiments, after scraping the credentials of the user for the EHR system, such as her username, her password, or the like, the credentials may be manipulated by the extension. In some exemplary embodiments, the extension may perform one or more manipulations on the credentials, e.g., using one or more manipulation records, such as by adding a salt to the credentials, using a one-way function to encrypt the credentials, using a hash function (e.g., a one-way hash function) to encrypt the credentials, or the like. In some cases, the extension may apply to the EHR credentials a one-way function and combine the credentials with a key generated on the client side such as a salt, thereby creating unrecoverable new credentials for the user.

In some cases, the new credentials may be used as alternative credentials for the extending system. In some exemplary embodiments, the EHR credentials may be manipulated locally by the extension, desktop agent, or the like.

In some exemplary embodiments, the EHR credentials may be manipulated remotely such as by a backend server of the extending service, by a hybrid system of a backend and user device, or the like. For example, the extension may scrape the credentials and provide them to a server, which may manipulate the credentials. It is noted that the credentials may be transmitted over a secure channel (e.g. via a Virtual Private Network (VPN) channel), and to a trusted source.

In some cases, the new credentials may be stored at the user device, e.g., in association with the login session domain, a desktop application rendering the login session, or the like. In some cases, instead of storing the encrypted credentials themselves at the user device, one or more manipulation records may be stored locally at the user device. For example, the manipulation records may comprise a one-way function that was used to manipulate the credentials, a client-side generated salt or key, or the like, which may be used to re-generate the encrypted credentials for one or more subsequent login session.

In some exemplary embodiments, the encrypted credentials that are newly created, also referred to as the manipulated credentials, the new credentials, EHR-based credentials, or the like, may be sent to the backend of the extending service and stored at a backend database such as at an Identity Provider (IDP) of the extending server, as alternative credentials for the user account, e.g., in addition to dedicated credentials. In some exemplary embodiments, in the backend of the extending service, each user account or identity may be stored in association with two or more credentials, e.g., a manipulated version of the EHR credentials, and dedicated credentials that are the default credentials for the extending service. In some cases, the manipulated credentials may comprise an encoded string that is based on the EHR credentials. In some cases, the backend of the extending service may store, for each user account, multiple manipulated credentials from different base systems. For example, the backend of the extending service may store first EHR-based credentials of a first EHR system, and second EHR-based credentials of a second EHR system. According to this example, each set of credentials may be stored in association with the base system to which it is configured. In some cases, the backend of the extending service, such as the IDP thereof, may not be privy to the EHR credentials themselves, but only to a manipulated version thereof, thereby complying with one or more privacy constraints.

In some exemplary embodiments, the IDP of the extending server may enable the user to utilize the login session of the EHR system to simultaneously login to the extending system's account. In some exemplary embodiments, the trustless single sign on procedure may utilize EHR credentials such as a password to the EHR system, in a trustless manner, without retaining a backend integration between the extending system and the EHR system. In some exemplary embodiments, upon logging in to the user's account in the extending service's backend, the extending layer may be activated and be enabled it to push content or load resources into the EHR session, according to permissions of the user account.

One technical effect of utilizing the disclosed subject matter is enabling a user to automatically sign on to one or more applications, extending services, or the like, upon signing in to a base system such as an EHR system, without implementing an SSO mechanism. The trustless single sign on may enable to launch the extending service, without integrating the extending system with the backends of EHR systems.

Another technical effect of utilizing the disclosed subject matter is creating a smooth and seamless integration of the extending layer with the EHR system, while enabling the layer to push valuable content to a user's workflow, e.g., without requiring the user to log in to the extending service manually upon every entrance to the EHR system.

Yet another technical effect of utilizing the disclosed subject matter is eliminating challenges of ingesting, processing, storing, and utilizing healthcare data, by providing an extending layer or application that is loaded over the workflow and provides missing or additional data, functionality, or the like. The extending layer may be executed over multiple EHRs, payer systems, provider systems, or the like.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 illustrating a flowchart diagram of a method, in accordance with some exemplary embodiments of the disclosed subject matter.

On Step 100, a login session in a GUI of a user device may be identified. In some exemplary embodiments, the login session may be configured to enable a user of a user device to login to a first software system, e.g., an EHR system. In some exemplary embodiments, the login session may be identified, e.g., by monitoring the user's display, screen, or the like, and identifying a login session using computer vision techniques, machine learning techniques, heuristics-based detection, object recognition techniques, automatic classifiers, text recognition methods, image recognition methods, monitoring network traffic, monitoring or invoking Windows native API calls, invoking network API calls, or the like. In some exemplary embodiments, the user's display may be monitored by a software agent such as the browser extension. In some exemplary embodiments, the browser extension may be generated or provided by a party different from the provider of the first software system, e.g., by a party providing a second software system such as the extending service.

In some exemplary embodiments, the browser extension may be executed by a browser rendering the first software system to which the user is attempting to log in during the login session. In some exemplary embodiments, extensions may be configured to be executed by a browser such as a web browser, and may comprise source code without executables, executables, or the like. In some exemplary embodiments, browsers may allow extensions to perform user interface modifications, to monitor user interactions, to register to events, or the like, thus enabling the extension to monitor the browser's interface, customize the interface, load functionalities over a browsed page, present data over a browsed page, alter browser settings, add user interface items, replace website content, or the like. In case that the software agent comprises a desktop agent, instead of a browser extension, the desktop agent may be configured to be executed over a desktop application rendering the login session, and monitor a display thereof, the user device's screen, or the like, and detect a login session in the display. In some exemplary embodiments, the extension may be configured to detect any login session, or specific login sessions that are associated to defined systems (e.g., only a login session of the EHR system).

On Step 110, one or more user credentials may be extracted from the login session, e.g., by the agent. In some exemplary embodiments, the one or more user credentials may comprise one or more user inputs to the login session. For example, in case the first software system comprises an EHR system, EHR user credentials that are inserted to the EHR system or input fields thereof by the user may be obtained, scraped, extracted, or the like, e.g., by the browser extension, the desktop agent, or the like. In some exemplary embodiments, an identity of the first software system may be verified, such as based on private data of the user. In some exemplary embodiments, the private data may be extracted by the extension from the GUI of the user device upon rendering a page of the first software system in the user device, and compared to private user data that is retained in the backend of the second software system.

On Step 120, the one or more user credentials may be manipulated by the agent, using one or more manipulations, to thereby obtain manipulated credentials. In some exemplary embodiments, the user credentials may be manipulated by applying a one-way function on the one or more user credentials, thereby limiting an ability of third parties to derive the one or more user credentials from the manipulated credentials. In some exemplary embodiments, the user credentials may be manipulated by obtaining a user-specific salt, adding the user-specific salt to the one or more user credentials, thereby obtaining salted user credentials, and applying a one-way function on the salted user credentials, to thereby further limiting an ability of third parties to derive the one or more user credentials from the manipulated credentials.

In some cases, the salt may be obtained from a remote server (e.g., a server of the extending service), generated locally at a user device, determined based on a locally generated key, or the like. For example, a key may be generated at a client side, such as at a user device, and the key may be used to generate or determine a salt for the extracted user credentials at the user device. In some exemplary embodiments, at least one manipulation record, such as a user-specific salt, may be detected in the local storage of the user device, and may be used for manipulating the user credentials. In some exemplary embodiments, in case at least one manipulation record, such as a user-specific salt, is identified as being absent from a local storage of the user device, the at least one manipulation record may be generated, e.g., locally at the user device, thereby generating the one or more manipulations. In some exemplary embodiments, a manipulation record may be configured to manipulate the one or more user credentials and may comprise a salt, a one-way function, or the like. In some exemplary embodiments, upon generating or obtaining one or more manipulation records, the user credentials may be manipulated using the one or more manipulation records. For example, a one-way function may be obtained from a server, and a salt may be generated locally in case the local storage is absent from the storage.

In some exemplary embodiments, one or more manipulation records may be generated in response to identifying that a local memory of the user device does not retain at least one manipulation record. In some exemplary embodiments, the manipulation records may be generated in response to identifying that a local memory of the user device does not retain an authentication token that is associated to the user credentials of the first software system. For example, in case the first software system comprises an EHR system, and the second software system comprises the extending service, the extension may determine whether a token that is associated with the second software system is retained in the memory. For example, the token may comprise one or more manipulations that were applied to the EHR credentials, such as a one-way function, a salt, or the like. In case a token of the second software system is detected, the credentials may be manipulated using the token manipulations. In case a token of the second software system is not detected, a new token may be generated to include one or more salts, one-ways functions, or the like, and the credentials may be manipulated therewith. In some cases, a token may be matched to the second software system based on a name of the token, a memory location of the token, one or more strings in the token that match the identity of the second software system, or the like. In case the token is determined to be associated with the extending system, the token may be used to login the user to the extending system.

In some exemplary embodiments, the user credentials may be manipulated in response to identifying that the login session enabled the user to login to the first software system successfully. For example, in case of an EHR system, the EHR credentials may be manipulated, e.g., by hashing them with a one-way function, adding salt thereto, or the like, in case the login of the user to the EHR system was completed and was successful. In some exemplary embodiments, the user credentials may be manipulated regardless of a success of the login session. In some exemplary embodiments, the extension may evaluate a success of the login session based on a display of the user after logging into the first software system. For example, the login session may be estimated to be successful in case the display of the user after logging into the first software system depicts a window with the words 'successfully signed in', in case the display depicts a home page of the first software system, or the like. As another example, a successful login to the first software system may be evaluated by invoking a protected API call of the first software system, or in any other way.

On Step 130, the manipulated credentials may be automatically utilized in order to login the user into a user account of the same user in the second software system. In some cases, the second software system may be configured to be executed over the first software system. For example, in case the second software system comprises an extending service that is configured to be executed over the EHR system, such as using a browser extension executed by a browser that is used to present the frontend of the EHR system, the manipulated user credentials may be used to log the user into the extending service.

In some cases, a user account in the backend of the second software system may comprise one or more credentials associated with a user, such as one or more dedicated user credentials that are configured for logging into the second software system, one or more linked manipulated credentials that are based on credentials of respective EHR systems or other first software systems, or the like. In some exemplary embodiments, the browser extension may utilize the manipulated credentials in order to sign in to the second software system, e.g., in case the manipulated credentials are linked to a user account of the second software system.

In some exemplary embodiments, in case the login session of the user into the first software system was never before monitored by the browser extension, the manipulated credentials may not yet be linked to a user account of the second software system. In some exemplary embodiments, in case the manipulated credentials are not linked to a user account of the second software system, the manipulated credentials may not be identified by a backend of the second software system. In some exemplary embodiments, in such a case, a matching or linking process may be performed in which additional credentials to log into the service may be obtained from the user, e.g., manually. In some cases, the additional credentials may comprise dedicated credentials of the second software system. In some exemplary embodiments, the browser extension may directly ask the user for dedicated credentials or other permissions to login the user to her account in the second software system. In some exemplary embodiments, the dedicated credentials may be different from the manipulated credentials. For example, the dedicated credentials may comprise alternative user credentials of the user that are associated to the user account of the user in the second software system, such as default credentials to an extending service that is configured to be executed over an EHR system. In some exemplary embodiments, based on the dedicated credentials, an account of the user may be identified in the second software system. In some exemplary embodiments, the account of the user may be linked to the manipulated credentials, such as by storing the manipulated credentials in association with the user account, thereby enabling the backend of the second software system to login the user into the second software system using the manipulated credentials. In some exemplary embodiments, linking the manipulated credentials to the user's account may enable subsequent login sessions into the second software system to automatically utilize the manipulated credentials in order to login to the user account.

In some exemplary embodiments, the manipulated credentials may not be linked to a user account of the second software system in one or more additional scenarios, such as in case a password to the second software system was changed, updated, or the like. For example, in case EHR credentials that were previously used, in their manipulated form, by the extending system, have changed in the EHR system, the modified EHR credentials may not enable the extension to login the user to her user account in the extending system.

In some cases, a password changing session may be identified in the GUI of the user device, e.g., automatically. In some exemplary embodiments, the password changing session may be configured to replace the user credentials of the first software system with second user credentials, thereby changing user credentials of the user in the first software system. In some exemplary embodiments, the second user credentials may be extracted from the GUI, e.g., by the browser extension. In some exemplary embodiments, the second user credentials may be manipulated using the one or more manipulations, e.g., by the browser extension, thereby obtaining second manipulated credentials. In some exemplary embodiments, the second user credentials may be manipulated using a same salt, a same one-way function, or the like, that was used to manipulate the previous user credentials. In some exemplary embodiments, the second manipulated credentials may be automatically linked to an account of the user in the second software system, thereby enabling to login the user into the second software system using the second manipulated credentials instead of the manipulated credentials. Alternatively, instead of automatically detecting password changing sessions, a next login of the user to the second software system may fail, the user may be requested to provide dedicated user credentials to the second software system, and the user account may be linked to the new manipulated credentials.

In some exemplary embodiments, after the user account in the second software system is linked to the manipulated user credentials of the first software system, the user may be logged in automatically for any subsequent session of the first software system, e.g., until a password change event. For example, the user may be logged in by extracting the user credentials and manipulating them, by identifying stored manipulation records (e.g., in a token) that match the first software system, or the like. In some exemplary embodiments, an authentication token to the second software system (e.g., that is linked to credentials of the first software system) may be stored in the user device, and may comprises a temporary and signed access token that cannot be modified. In some exemplary embodiments, the authentication token may be utilized automatically upon identifying a login to a base service such as the first software system. In some exemplary embodiments, it may be advantageous to automatically log in to an extending service without performing a new linking process every time that the user logs in to the first software system, at least since performing a new linking process every time may be computationally consuming, time consuming, communication resources consuming, or the like.

In some cases, upon logging in successfully to the extending service, the extending service may be configured to execute an extending layer over any rendered EHR page. The extending service may be configured to provide an augmented functionality providing an additional functionality to the GUI of the EHR system, via an overlay over an EHR page displayed by the browser. In some cases, the extending layer may provide augmented applications or functionalities that can be executed over the browsed page. In some exemplary embodiments, the extending layer may derive data and functionalities from different EHR systems that retain separate data records that are associated with the same patient, or can be useful to the patient. In some exemplary embodiments, the extending service may store data from different systems. In some cases, utilizing the extending layer may enable a provider taking care of a patient to access additional information about his patient, to access additional functionalities for her patient, or the like, such as identifying background diseases of the patient that are not recorded in the EHR system used by the provider, booking a physician office visit with a physician that is not supported by the EHR system of the provider, or the like.

Figure 2:
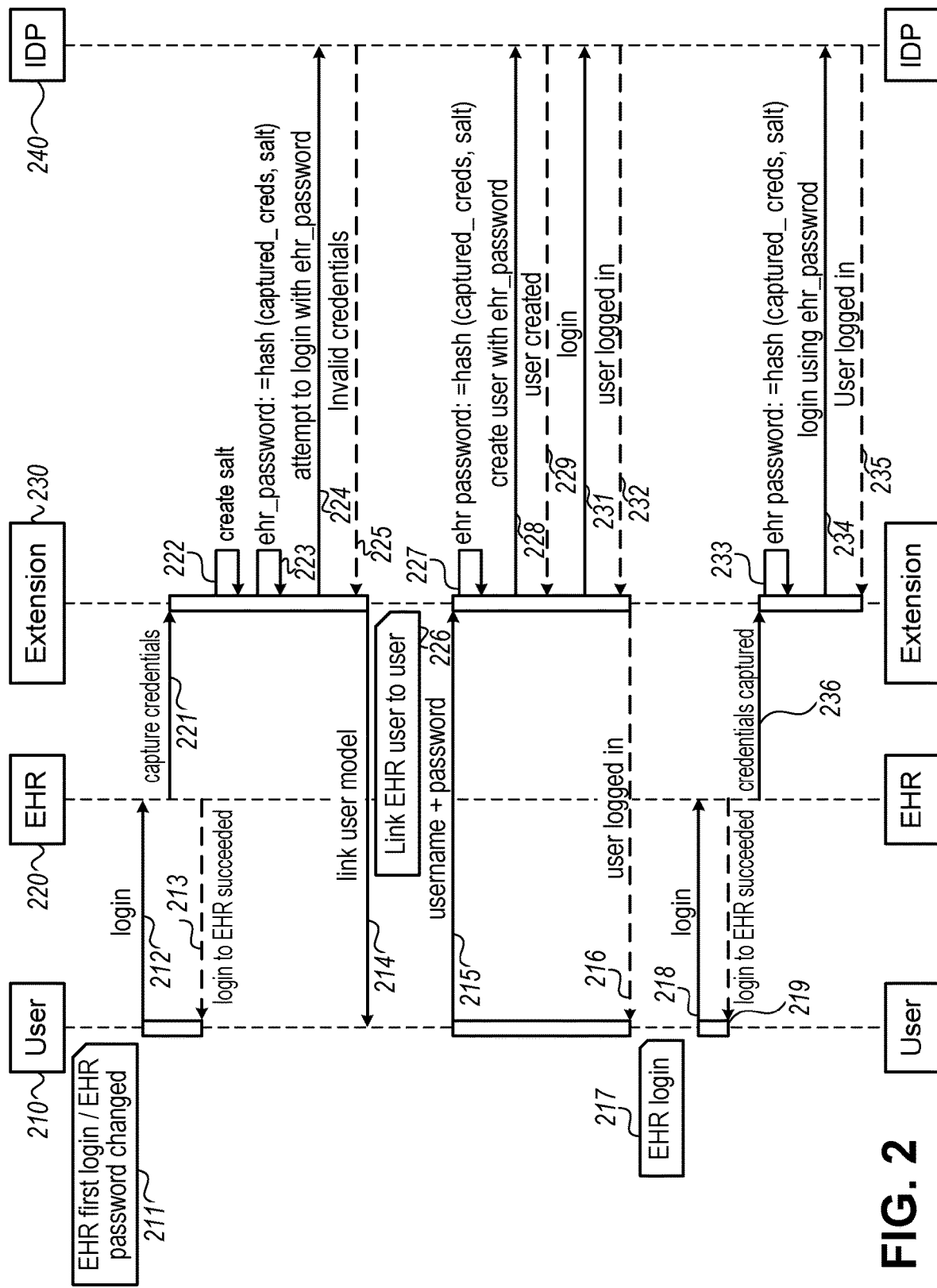
FIG. 2 illustrates an exemplary scenario, in accordance with some exemplary embodiments of the disclosed subject matter.

Referring now to FIG. 2 illustrating an exemplary scenario, in accordance with some exemplary embodiments of the disclosed subject matter.

In some exemplary embodiments, FIG. 2 is exemplified with relation to a first software system that comprises an EHR system, and a second software system that comprises an extending service that enables to integrate different EHR systems. In some exemplary embodiments, the GUI of the first software system may be executed using a browser, and the second software system may be associated with a browser extension that is executed by the browser, thus enabling the second software system to provide an augmented functionality providing an additional functionality to the GUI of the first software system via an overlay over a page displayed by the browser. It is noted that the disclosed subject matter is not limited to this scenario, and any other software systems may be utilized besides the EHR system and the extending system.

In some exemplary embodiments, at a First Login Stage 211, a User 210 may perform a Login Attempt 212 to EHR System 220. In some exemplary embodiments, Login Attempt 212 may comprise a first attempt to login to EHR System 220 after changing a password of EHR System 220. In some exemplary embodiments, Login Attempt 212 may comprise a first attempt to login to EHR System 220, e.g., before any other attempt has ever been performed, before Extension 230 has ever monitored such an attempt, or the like. In some exemplary embodiments, Login Attempt 212 may comprise a login session in which a GUI of a user device used by User 210 enables User 210 to interact therewith, fill text fields therein with credentials, or the like. For example, User 210 may be a clinic worker that may attempt to login to EHR System 220 on behalf of one or more patients.

In some exemplary embodiments, Extension 230 may comprise a browser extension that is executed by a browser rendering the login session, a desktop agent rendering the login session, or the like. As illustrated in FIG. 2, during First Login Stage 211, Extension 230 may monitor the input from User 210 at Login Attempt 212, and capture the inputted credentials (Step 221). In some exemplary embodiments, Extension 230 may identify that the GUI of the user device comprises a login session into EHR System 220, and determine that the extracted input comprises user credentials of User 210.

In some exemplary embodiments, after Step 221, Extension 230 may or may not monitor the user device's screen to identify whether the login attempt to EHR System 220 was successful. In some exemplary embodiments, in case the login attempt to EHR System 220 is successful, one or more indications of the successful login may be detected. For example, an indication of a successful login may be provided via the GUI of EHR System 220, which may be indicate visually and/or textually whether the login was successful. As another example, an indication of a successful login may be determined by invoking a network API call, invoking a database query in a desktop application of EHR System 220, or the like. In some exemplary embodiments, in case the login attempt to EHR System 220 is not successful, Extension 230 may not store or process further the captured credentials. In such cases, Extension 230 may capture any subsequent credentials inputted by User 210 to the login page until a login is successful.

In some exemplary embodiments, Extension 230 may process the captured credentials, e.g., in case the login attempt to EHR System 220 is successful. In some exemplary embodiments, Extension 230 may manipulate the captured credentials using one or more manipulation techniques, records, or the like, such as using a salt, a one-way function, or the like. For example, Extension 230 may generate or obtain a salt (Step 222) for adding to the credentials, such as in case an existing salt for encrypting the credentials of EHR System 220 is not detected in a local storage of the user device, in case an existing salt is not detected in a remote storage, or the like. In some exemplary embodiments, the salt may be stored in a local state of the user device, remotely, or the like, and may be used for subsequent logins of User 210 to EHR System 220, for logins of User 210 to other systems, or the like. For example, the salt may be stored in associated with EHR System 220, independently thereof, or the like. In some exemplary embodiments, Extension 230 may store the salt in a storage of the extension, in a disk storage, in a local database or repository, in a Random-Access Memory (RAM) storage of a user device over which the extension is executed, in a cache memory, a combination thereof, or the like.

In some exemplary embodiments, Extension 230 may utilize the salt, and/or one or more additional manipulating components such as a hash function or any other one-way function, in order to generate manipulated user credentials based on the EHR credentials (Step 223). The newly generated user credentials, also referred to as the 'manipulated credentials' or the 'EHR-based credentials', may be generated based on a hash function applied on the scraped EHR credentials to which the generated salt is added, or by performing any other manipulation to the EHR credentials, thereby producing EHR-based credentials for a backend of the extending service, e.g., Identity Provider (IDP) 240. In some cases, the manipulation process may utilize additional values in addition to the EHR credentials, such as a timestamp of the login session, any other timestamp, an organization name associated with User 210, or the like. For example, the manipulated credentials may be generated by hashing and adding salt to a combination of the EHR credentials and the timestamp.

In some exemplary embodiments, after generating the EHR-based credentials, Extension 230 may attempt to login User 210 to a backend of the extending service, e.g., via IDP 240 (Step 224). In some exemplary embodiments, in case a user account of User 210 that is stored in IDP 240 is not linked to the EHR-based credentials, which may be the case when the attempt is the first attempt of Extension 230 to login to the extending system using the EHR-based credentials, the login may fail. In such cases, IDP 240 may indicate to Extension 230 that the manipulated credentials are invalid, are unknown, or the like (Step 225).

In some exemplary embodiments, in case of failure to identify the account of User 210 in IDP 240 using the EHR-based credentials, the disclosed subject matter may perform a Linking Stage 226 that is configured to link the EHR-based credentials to the account of User 210 in IDP 240. In some exemplary embodiments, Linking Stage 226 may be performed in case User 210 has changed her EHR credentials (e.g., via a password change session), which may affect the EHR-based credentials, in case User 210 has never before used the EHR credentials, in case Extension 230 has never extracted the EHR credentials before, or the like.

In some exemplary embodiments, during the Linking Stage 226, one or more additional credentials may be used to identify the account of User 210 in IDP 240. In some cases, User 210 may be known to IDP 240 with a dedicated, alternative, credentials that are not based on any EHR credentials (e.g., referred to as non-EHR credentials). For example, User 210 may be known to IDP 240 with default credentials that are defined for directly logging into the extending service. Additionally or alternatively, the user account of User 210 may not pre-exist in IDP 240, and may be generated anew. In some exemplary embodiments, during the Linking Stage 226, Extension 230 may ask from User 210 to provide non-EHR credentials for the extending service, e.g., designated credentials for the extending service (Step 214). In some exemplary embodiments, User 210 may provide the non-EHR credentials, e.g., a user name and password, to Extension 230 (Step 215).

In some exemplary embodiments, upon obtaining the non-EHR credentials from User 210, Extension 230 may send the non-EHR credentials to IDP 240 identify the user account of User 210 in the backend of the extending service, e.g., in IDP 240, and instruct IDP 240 to link the account of User 210 to the EHR-based credentials. For example, Extension 230 may manipulate again the EHR credentials of EHR System 220 using the same manipulations, to obtain EHR-based credentials (Step 227). According to this example, the generated EHR-based credentials may be submitted to IDP 240, along with the non-EHR credentials provided by User 210, in order to enable IDP 240 to link the account of User 210 that is associated with the non-EHR credentials, to the EHR-based credentials (Step 228). Alternatively, Extension 230 may link the non-EHR credentials to the EHR-based credentials, and utilize the non-EHR credentials for logging in User 210.

In some exemplary embodiments, after linking the EHR-based credentials to the account of User 210, IDP 240 may send to Extension 230 a confirmation that an account of User 210 that is linked to the EHR-based credentials has been created, adjusted, linked, or the like (Step 229). In other cases, no confirmation may be needed. In some exemplary embodiments, after the Linking Stage 226, the user account in the extending service may be linked to two alternative and different credentials that can be used for logging User 210 in to her account: the non-EHR related credentials that may be used directly by User 210; and the EHR-based credentials that may be utilized automatically by Extension 230 as alternative login credentials in the trustless SSO process. In some exemplary embodiments, User 210 may have at least two alternative sets of credentials that can be used to login to the extending service, including the EHR-based credentials that are manipulated by Extension 230, and the default non-EHR related credentials.

In some exemplary embodiments, upon successful creation or updating of the user account for User 210, Extension 230 may request from IDP 240 to log User 210 into her newly generated, linked, or updated account (Step 231). In some exemplary embodiments, in response to the request, IDP 240 may log User 210 into her account, according to the EHR-based credentials, and notify Extension 230 that User 210 has logged in successfully (Step 232). In some exemplary embodiments, upon obtaining from IDP 240 an indication that User 210 is logged in, Extension 230 may notify User 210 that she has successfully logged into the extending service (Step 216). Alternatively, User 210 may not be notified.

In some exemplary embodiments, during the logged in session, Extension 230 may execute an extending layer over EHR System 220 until the EHR session of EHR System 220 terminates, until User 210 logs out of her user account, or the like. In some exemplary embodiments, during the logged in session, IDP 240 may enable the backend of the extending service to provide data and/or functionalities to the extending layer in case User 210 is authorized to view or access such data. In some exemplary embodiments, upon terminating the EHR session, the execution of the extending layer may be terminated as well. Alternatively, the EHR session and the extending layer may be executed in independent processes or sessions that may or may not be terminated together.

In some exemplary embodiments, in case User 210 attempts to login to the EHR System 220 once more, during a subsequent Login Session 217, User 210 may provide user credentials to EHR System 220 (Step 218). In some exemplary embodiments, Extension 230 may monitor Login Session 217, such as in order to determine whether the login was successful (Step 219). For example, a successful login may be detected by using computer vision techniques, or any other processing techniques, to identify a window in user device's screen with text or other visual indications that indicate that the login was successful, to identify that a GUI is estimated to depict a EHR system after being logged in, or the like. In some exemplary embodiments, in case the login is determined to be successful, or prior thereto, Extension 230 may scrape the user credentials that are provided to Login Session 217 (Step 236).

In some exemplary embodiments, the scraped user credentials may be manipulated in a same manner as before, e.g., by manipulating the EHR password with stored manipulation components such as the same salt and one-way function that were previously used for manipulating the EHR credentials (Step 233). In some exemplary embodiments, Extension 230 may send the manipulated credentials to IDP 240, in an attempt to login User 210 to the extending service (Step 234). In some exemplary embodiments, IDP 240 may identify the manipulated credentials as relating to the user account of User 210, at least since the manipulated credentials were linked to the user account at Linking Stage 226. In some exemplary embodiments, in response to identifying the user account of User 210, and verifying that the manipulated credentials are correct, IDP 240 may enable User 210 to login into her user account, and notify Extension 230 that User 210 is logged in to the extending service (Step 235).

In some exemplary embodiments, in order to minimize the required intervention of users when utilizing the extending service, Extension 230 may be configured to automatically update credentials without requiring user intervention, without requiring direct interactions of User 210 with Extension 230, or the like. For example, in case User 210 changes her password in the EHR System 220, the Extension 230 may automatically monitor and identify the changing password session (e.g., using computer vision techniques), automatically scrape the inserted user credentials (e.g., by monitoring keyboard inputs, scraping the DOM representation, or the like), and automatically update IDP 240 with the modified user credentials. In case the change of EHR credentials is not detected automatically by Extension 230, the IDP 240 may not be informed of such change, and upon identifying a Login Session 217 into EHR System 220, Extension 230 may not be able to login User 210 to the user account in IDP 240. For example, Extension 230 may scrape the user credentials, manipulate them using the stored manipulation records, send them to IDP 240, and obtain from IDP 240 an indication that the provided credentials are invalid. In some exemplary embodiments, in case Extension 230 is unable to login User 210 to the user account, User 210 may be prompted by Extension 230 to re-establish the link between the EHR-based credentials and the extending service user account, such as similarly to Linking Stage 226.

Figure 3:
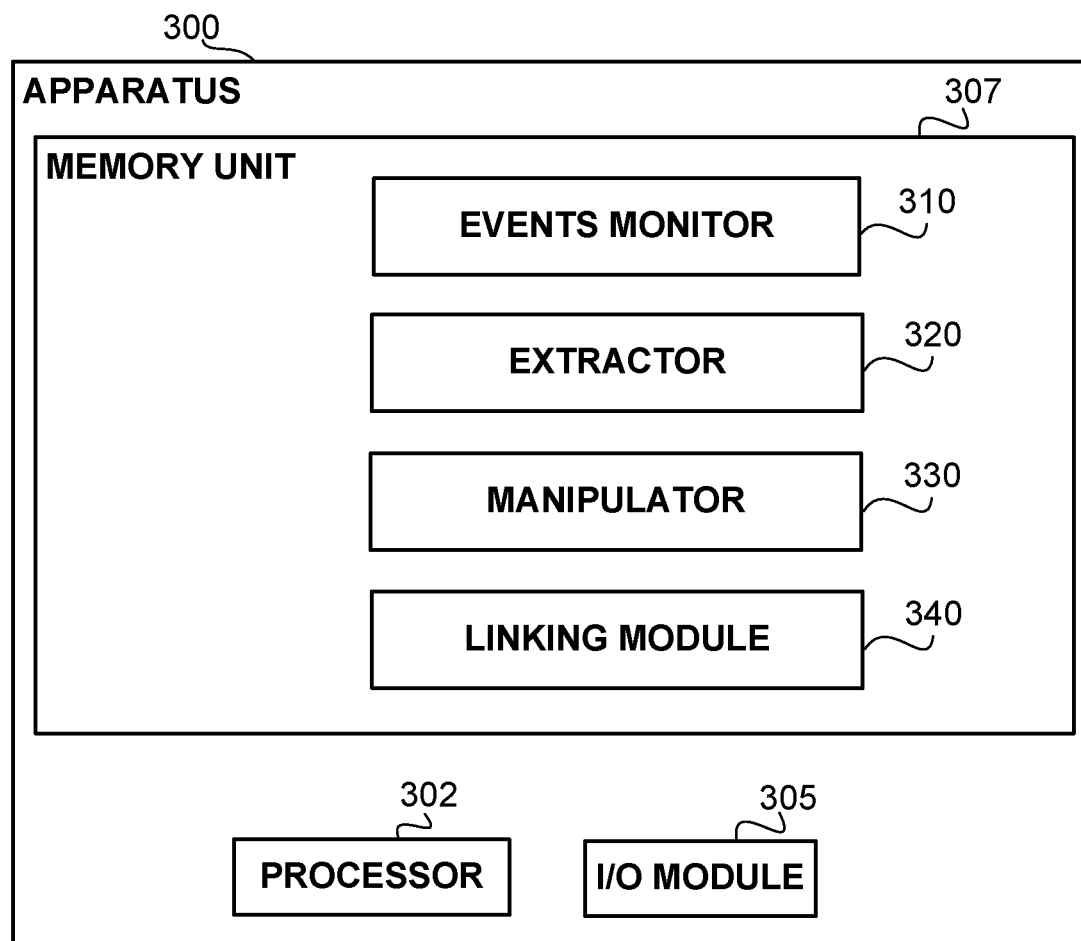
FIG. 3 illustrates an exemplary block diagram of an apparatus, in accordance with some exemplary embodiments of the disclosed subject matter.

Referring now to FIG. 3 showing a block diagram of an apparatus, in accordance with some exemplary embodiments of the disclosed subject matter.

In some exemplary embodiments, an Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of its subcomponents. Processor 302 may be configured to execute computer-programs useful in performing the methods or processes of FIGS. 1-2, or the like.

In some exemplary embodiments of the disclosed subject matter, an Input/Output (I/O) Module 305 may be utilized to provide an output to and receive input from a user. I/O Module 305 may be used to transmit and receive information to and from the user or any other apparatus, e.g., a server, in communication therewith.

In some exemplary embodiments, Apparatus 300 may comprise a Memory Unit 307. Memory Unit 307 may be a short-term storage device or long-term storage device. Memory Unit 307 may be a persistent storage or volatile storage. Memory Unit 307 may be a disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300. In some exemplary embodiments, Memory Unit 307 may retain program code operative to cause Processor 302 to perform acts associated with any of the steps in FIGS. 1-2, or the like.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

In some exemplary embodiments, Events Monitor 310 may be configured to monitor login sessions, password changing sessions, or the like, e.g., periodically or continuously. In some exemplary embodiments, Events Monitor 310 may detect events of login sessions that may or may not be associated to a defined application, website, or the like. For example, Events Monitor 310 may be configured to detect an event in which a user logs into a first software system, e.g., an EHR system, changes a password thereof, or the like, while logging into another system may not be considered an event.

In some exemplary embodiments, Extractor 320 may be configured to obtain event indications from Events Monitor 310, and extract user credentials that are inputted by a user to a session through an inputting device, a vocal command, an automatic password inserter, or the like. In some exemplary embodiments, user inputs may be provided via one or more keyboards, mouses, touchscreens, vocal command systems, or the like, associated with I/O Module 305.

In some exemplary embodiments, Manipulator 330 may be configured to manipulate the user credentials that were extracted by Extractor 320 using one or more user-specific salts, one-way functions, or the like, that may be retained locally in the user device, remotely on behalf of the user device, or the like. In some cases, different manipulations may be stored for a same user device, and may be used for different underlying systems to which the user may login.

In some exemplary embodiments, Linking Module 340 may be configured to link the manipulated credentials, which were obtained from Manipulator 330, to a backend of an extending system. For example, in case of a password change, Linking Module 340 may contact a backend of an extending system that is configured to be executed over the underlying system, in order to link the manipulated credentials to the account of the user, update previous credentials with the new password, or the like. In some exemplary embodiments, in case of a login session, Linking Module 340 may utilize the manipulated credentials in order to login to an extending system that is configured to be executed over the underlying system. In some exemplary embodiments, in case the login to the extending service fails, Linking Module 340 may obtain dedicated credentials from the user, and link the account that is associated to the dedicated credentials to the manipulated credentials.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
identifying a login session in a Graphical User Interface (GUI) of a user device, wherein the login session is configured to enable a user of the user device to login to a first software system, wherein said identifying is performed by a software module that is separate from the first software system;
extracting one or more user credentials from the login session, wherein the one or more user credentials comprise one or more user inputs to the login session;
manipulating the one or more user credentials using one or more manipulations, thereby obtaining manipulated credentials;
identifying that the login session enabled the user to login to the first software system successfully; and
subsequently to said identifying that the login session enabled the user to login to the first software system successfully, automatically utilizing the manipulated credentials in order to login the user into a second software system.

2. The method of claim 1, wherein the manipulated credentials are not identified by a backend of the second software system, wherein the method further comprises:
obtaining, from the user, dedicated credentials of the second software system, wherein the dedicated credentials are different from the manipulated credentials;
identifying, based on the dedicated credentials, an account of the user in the second software system; and
linking the account of the user to the manipulated credentials, thereby enabling the backend of the second software system to login the user into the second software system using the manipulated credentials.

3. The method of claim 1, wherein said manipulating comprises applying a one-way function on the one or more user credentials, whereby limiting an ability of deriving the one or more user credentials from the manipulated credentials.

4. The method of claim 1, wherein said manipulating comprises obtaining a user-specific salt, adding the user-specific salt to the one or more user credentials, thereby obtaining salted user credentials, and applying a one-way function to the salted user credentials, to thereby limit an ability of deriving the one or more user credentials from the manipulated credentials.

5. The method of claim 1 further comprising:
identifying a password changing session in the GUI of the user device, wherein the password changing session is configured to replace the one or more user credentials with one or more second user credentials, thereby changing user credentials of the user in the first software system;
extracting the one or more second user credentials from the GUI;
manipulating the one or more second user credentials using the one or more manipulations, thereby obtaining second manipulated credentials; and
automatically linking the second manipulated credentials to an account of the user in the second software system, whereby enabling to login the user into the second software system using the second manipulated credentials instead of the manipulated credentials.

6. The method of claim 1 further comprising:
identifying that at least one manipulation record is absent from a local storage of the user device, wherein the at least one manipulation record is configured to manipulate the one or more user credentials;
generating the at least one manipulation record, thereby generating the one or more manipulations; and
performing said manipulating using the at least one manipulation record.

7. The method of claim 1, wherein the GUI comprises a GUI of the first software system, wherein said identifying that the login session enabled the user to login to the first software system successfully is based on a visual indication in the GUI of the first software system, the GUI of the first software system is presented by the user device.

8. The method of claim 1, wherein said identifying the login session is based on at least one of: computer vision techniques, object detection techniques, monitoring network traffic, monitoring network Application Programming Interface (API) calls, invoking network API calls, and invoking Operating System (OS) specific native API calls.

9. The method of claim 1, wherein the second software system is configured to extend a functionality of the first software system.

10. The method of claim 9, wherein the GUI of the first software system is executed using a browser, wherein the second software system is associated with a browser extension that is executed by the browser, whereby the second software system provides an augmented functionality providing an additional functionality to the GUI of the first software system via an overlay over a page displayed by the browser.

11. An apparatus comprising a processor and coupled memory, said processor being adapted to:
identify a login session in a Graphical User Interface (GUI) of a user device, wherein the login session is configured to enable a user of the user device to login to a first software system, wherein said identify is performed by a software module that is separate from the first software system;
extract one or more user credentials from the login session, wherein the one or more user credentials comprise one or more user inputs to the login session;
manipulate the one or more user credentials using one or more manipulations, thereby obtaining manipulated credentials;
identifying that the login session enabled the user to login to the first software system successfully; and
subsequently to said identifying that the login session enabled the user to login to the first software system successfully, automatically utilize the manipulated credentials in order to login the user into a second software system.

12. The apparatus of claim 11, wherein the manipulated credentials are not identified by a backend of the second software system, wherein the processor is further adapted to:
obtain, from the user, dedicated credentials of the second software system, wherein the dedicated credentials are different from the manipulated credentials;
identify, based on the dedicated credentials, an account of the user in the second software system; and
link the account of the user to the manipulated credentials, thereby enabling the backend of the second software system to login the user into the second software system using the manipulated credentials.

13. The apparatus of claim 11, wherein said manipulating comprises applying a one-way function on the one or more user credentials, whereby limiting an ability of deriving the one or more user credentials from the manipulated credentials.

14. The apparatus of claim 11, wherein said manipulating comprises obtaining a user-specific salt, adding the user-specific salt to the one or more user credentials, thereby obtaining salted user credentials, and applying a one-way function to the salted user credentials, to thereby limit an ability of deriving the one or more user credentials from the manipulated credentials.

15. The apparatus of claim 11, wherein the processor is further adapted to:
identify a password changing session in the GUI of the user device, wherein the password changing session is configured to replace the one or more user credentials with one or more second user credentials, thereby changing user credentials of the user in the first software system;
extract the one or more second user credentials from the GUI;
manipulate the one or more second user credentials using the one or more manipulations, thereby obtaining second manipulated credentials; and
automatically link the second manipulated credentials to an account of the user in the second software system, whereby enabling to login the user into the second software system using the second manipulated credentials instead of the manipulated credentials.

16. The apparatus of claim 11, wherein the processor is further adapted to:
identify that at least one manipulation record is absent from a local storage of the user device, wherein the at least one manipulation record is configured to manipulate the one or more user credentials;
generate the at least one manipulation record, thereby generating the one or more manipulations; and
perform said manipulating using the at least one manipulation record.

17. The apparatus of claim 11, wherein the GUI comprises a GUI of the first software system, wherein said identifying that the login session enabled the user to login to the first software system successfully is based on a visual indication in the GUI of the first software system, the GUI of the first software system is presented by the user device.

18. The apparatus of claim 11, wherein the second software system is configured to extend a functionality of the first software system.

19. The apparatus of claim 18, wherein the GUI of the first software system is executed using a browser, wherein the second software system is associated with a browser extension that is executed by the browser, whereby the second software system provides an augmented functionality providing an additional functionality to the GUI of the first software system via an overlay over a page displayed by the browser.

20. A computer program product comprising a non-transitory computer readable medium retaining program instructions, which program instructions when read by a processor, cause the processor to:
identify a login session in a Graphical User Interface (GUI) of a user device, wherein the login session is configured to enable a user of the user device to login to a first software system, wherein said identify is performed by a software module that is separate from the first software system;
extract one or more user credentials from the login session, wherein the one or more user credentials comprise one or more user inputs to the login session;
manipulate the one or more user credentials using one or more manipulations, thereby obtaining manipulated credentials;
identifying that the login session enabled the user to login to the first software system successfully; and
subsequently to said identifying that the login session enabled the user to login to the first software system successfully, automatically utilize the manipulated credentials in order to login the user into a second software system.

\* \* \* \* \*